(12) United States Patent  (10) Patent No.: US 8,407,055 B2
Asano et al.  (45) Date of Patent: Mar. 26, 2013

(54) INFORMATION PROCESSING APPARATUS AND METHOD FOR RECOGNIZING A USER'S EMOTION

(75) Inventors: Yasuharu Asano, Kanagawa (JP); Noriyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1110 days.

(21) Appl. No.: 11/498,348

(22) Filed: Aug. 3, 2006

(65) Prior Publication Data

US 2007/0033050 A1 Feb. 8, 2007

(30) Foreign Application Priority Data

Aug. 5, 2005 (JP) ................................. 2005-227527

(51) Int. Cl.
*G10L 21/06* (2006.01)
*G10L 15/16* (2006.01)
(52) U.S. Cl. ................ 704/270; 704/E17.002; 704/251; 704/275; 704/231
(58) Field of Classification Search .................. 704/275, 704/251, 231, 270, E17.002
See application file for complete search history.

(56) References Cited

U.S. PATENT DOCUMENTS

| | | | | |
|---|---|---|---|---|
| 6,144,938 | A * | 11/2000 | Surace et al. ................. | 704/257 |
| 6,480,826 | B2 * | 11/2002 | Pertrushin ..................... | 704/270 |
| 6,585,521 | B1 * | 7/2003 | Obrador ........................ | 434/236 |
| 6,731,307 | B1 * | 5/2004 | Strubbe et al. ................. | 715/727 |
| 6,757,362 | B1 * | 6/2004 | Cooper et al. ............. | 379/88.01 |
| 7,058,566 | B2 * | 6/2006 | Shaw ................................ | 704/9 |
| 7,225,122 | B2 * | 5/2007 | Shaw ................................ | 704/9 |
| 7,346,492 | B2 * | 3/2008 | Shaw ................................ | 704/9 |
| 7,606,701 | B2 * | 10/2009 | Degani et al. .................. | 704/207 |
| 2002/0029203 | A1 * | 3/2002 | Pelland et al. .................. | 706/12 |
| 2002/0173958 | A1 * | 11/2002 | Asano et al. ................... | 704/251 |
| 2002/0174425 | A1 * | 11/2002 | Markel et al. ................... | 725/13 |
| 2003/0033145 | A1 * | 2/2003 | Petrushin ....................... | 704/236 |
| 2003/0118974 | A1 * | 6/2003 | Obrador ........................ | 434/236 |
| 2004/0001616 | A1 * | 1/2004 | Gutta et al. .................... | 382/118 |
| 2005/0149467 | A1 * | 7/2005 | Ono et al. ........................ | 706/61 |
| 2005/0159958 | A1 * | 7/2005 | Yoshimura .................... | 704/276 |
| 2005/0223237 | A1 * | 10/2005 | Barletta et al. ................. | 713/186 |
| 2005/0289582 | A1 * | 12/2005 | Tavares et al. .................. | 725/10 |

(Continued)

FOREIGN PATENT DOCUMENTS

JP 10 228295 8/1998
JP 2000 259831 9/2000

(Continued)

OTHER PUBLICATIONS

Frank Dellaert et al., Recognizing Emotion in Speech, in Proc. of Int'l Conf. on Speech and Language Processing (1996).*

(Continued)

*Primary Examiner* — Pierre-Louis Desir
*Assistant Examiner* — Abdelali Serrou
(74) *Attorney, Agent, or Firm* — Frommer Lawrence & Haug LLP; William S. Frommer; Thomas F. Presson

(57) ABSTRACT

An information processing apparatus includes an obtaining unit that obtains meta-information concerning content; a predicting unit that predicts an emotion of a user who is viewing the content from the meta-information obtained by the obtaining unit; and a recognizing unit that recognizes an emotion of the user using the emotion predicted by the predicting unit and user information acquired from the user.

13 Claims, 6 Drawing Sheets

U.S. PATENT DOCUMENTS

| | | | |
|---|---|---|---|
| 2006/0028488 A1* | 2/2006 | Gabay et al. | 345/626 |
| 2006/0122834 A1* | 6/2006 | Bennett | 704/256 |
| 2006/0122838 A1* | 6/2006 | Schindler et al. | 704/271 |
| 2006/0200342 A1* | 9/2006 | Corston-Oliver et al. | 704/10 |
| 2007/0223871 A1* | 9/2007 | Thelen | 386/52 |

FOREIGN PATENT DOCUMENTS

| | | |
|---|---|---|
| JP | 2003 248837 | 9/2003 |
| JP | 2004 171288 | 6/2004 |
| JP | 2005 56388 | 3/2005 |
| JP | 2005 135432 | 5/2005 |
| JP | 2005-348872 | 12/2005 |

OTHER PUBLICATIONS

Polzin et al., Detecting Emotions in Speech, Proceedings of the Cooperative Multimodal Communication Conference, 1998.*

Shoshei Matsumoto et al., "Emotion Recognition Using Face Image and Speech Information for Robots" The $22^{nd}$ Annual Conference of the Robotics Society of Japan, Sep. 2004.

* cited by examiner

FIG. 3

| GENRE | PREDICTABLE EMOTIONS & BEHAVIORS |
|---|---|
| VARIETY SHOWS | HAPPINESS, LAUGHTER, APPLAUSE, SURPRISE, ANGER, DISGUST |
| SPORTS | APPLAUSE, YELL, SURPRISE, ANGER, HAPPINESS |
| ROMANTIC DRAMAS | LAUGHTER, ANGER, HAPPINESS, SADNESS |
| HORROR FILMS | YELL, SURPRISE, FEAR, DISGUST |

FIG. 4

| GENRE | SURPRISE | FEAR | DISGUST | ANGER | HAPPINESS | SADNESS | LAUGHTER | APPLAUSE | CRY | YELL |
|---|---|---|---|---|---|---|---|---|---|---|
| VARIETY SHOWS | 0.1 | 0.0 | 0.05 | 0.05 | 0.4 | 0.0 | 0.3 | 0.1 | 0.0 | 0.0 |
| SPORTS | 0.2 | 0.0 | 0.0 | 0.2 | 0.2 | 0.0 | 0.0 | 0.2 | 0.0 | 0.2 |
| ROMANTIC DRAMAS | 0.0 | 0.0 | 0.0 | 0.1 | 0.4 | 0.4 | 0.1 | 0.0 | 0.0 | 0.0 |
| HORROR FILMS | 0.3 | 0.3 | 0.1 | 0.0 | 0.0 | 0.0 | 0.0 | 0.0 | 0.2 | 0.2 |

INFORMATION PROCESSING APPARATUS AND METHOD FOR RECOGNIZING A USER'S EMOTION

CROSS REFERENCES TO RELATED APPLICATIONS

The present invention contains subject matter related to Japanese Patent Application JP 2005-227527 filed in the Japanese Patent Office on Aug. 5, 2005, the entire contents of which are incorporated herein by reference.

BACKGROUND OF THE INVENTION

1. Field of the Invention

The present invention relates to information processing apparatuses and methods, and programs. More specifically, the present invention relates to an information processing apparatus and method for recognizing a user's emotion based on information attached to content and information such as facial expressions of the user, and to a program used therewith.

2. Description of the Related Art

Techniques for recognizing (or estimating) a person's (or user's) emotion based on voice tone or facial expressions of the user have been proposed (see, for example, Japanese Unexamined Patent Application Publication No. 10-228295 and MATSUMOTO, et. al., "Emotion Recognition Using Face Image and Speech Information for Robots", The 22nd Annual Conference of Robotics Society of Japan).

SUMMARY OF THE INVENTION

In the methods of the related art for recognizing a user's emotion, voice of the user is obtained by using a microphone, and the emotion of the user is recognized based on the tone or the like of the voice. Further, an image of the face of the user is captured by using a camera, and the emotion of the user is recognized based on a facial expression obtained from the captured image.

In the approach for recognizing a user's emotion based on speech and image signals obtained from a microphone and camera, however, the emotion can be erroneously determined (that is, the recognition accuracy is low). Thus, it is desirable to recognize the emotion of the user with higher accuracy (that is, it is desirable to more reliably estimate the emotion of the user).

It is therefore desirable to achieve high-accuracy recognition (or estimation) of a user's emotion.

An information processing apparatus according to an embodiment of the present invention includes obtaining means for obtaining meta-information concerning content; predicting means for predicting an emotion of a user who is viewing the content from the meta-information obtained by the obtaining means; and recognizing means for recognizing an emotion of the user using the emotion predicted by the predicting means and user information acquired from the user.

The recognizing means may perform weighting for the emotion of the user according to the emotion predicted by the predicting means.

The information processing apparatus may further include sound-feature-value extracting means for collecting sound emitted from the user and extracting a feature value from the collected sound. The recognizing means may use the feature value extracted by the sound-feature-value extracting means as the user information.

The information processing apparatus may further include image-feature-value extracting means for capturing an image of the user and extracting a feature value from the captured image. The recognizing means may use the feature value extracted by the image-feature-value extracting means as the user information.

The meta-information obtained by the obtaining means may be text information concerning the content.

When the content includes audio information, the obtaining means may extract a feature value from the audio information, and may obtain the extracted feature value as the meta-information.

When the content includes speech information, the obtaining means may recognize speech based on the speech information, and may obtain text extracted from the recognized speech as the meta-information.

When the content includes video information, the obtaining means may obtain information concerning performers appearing in video based on the video information as the meta-information.

When the content has time information attached thereto, the obtaining means may extract the meta-information in accordance with the progress of the content according to the time information.

The predicting means may include a table used to predict the emotion of the user. The emotion of the user recognized by the recognizing means may be supplied to the predicting means, and the predicting means may update the table in response to the supplied recognized emotion of the user.

An information processing method according to another embodiment of the present invention includes the steps of obtaining meta-information concerning content; predicting an emotion of a user who is viewing the content from the obtained meta-information; and recognizing an emotion of the user using the predicted emotion and information acquired from the user.

A program according to another embodiment of the present invention causes a computer to execute a process including the steps of obtaining meta-information concerning content; predicting an emotion of a user who is viewing the content from the obtained meta-information; and recognizing an emotion of the user using the predicted emotion and information acquired from the user.

In an embodiment of the present invention, a user's emotion predicted from content being viewed by the user and information acquired from the user who is viewing the content are used to recognize the emotion of the user.

According to an embodiment of the present invention, therefore, a user's emotion can be recognized.

According to another embodiment of the present invention, information on content being viewed by the user and information acquired from behaviors of the user can be used to recognize the emotion of the user.

BRIEF DESCRIPTION OF THE DRAWINGS

FIG. 3 is a diagram showing prediction data stored in an emotion prediction unit;

FIG. 4 is a diagram showing prediction data stored in the emotion prediction unit;

DESCRIPTION OF THE PREFERRED EMBODIMENTS

Figure 1:
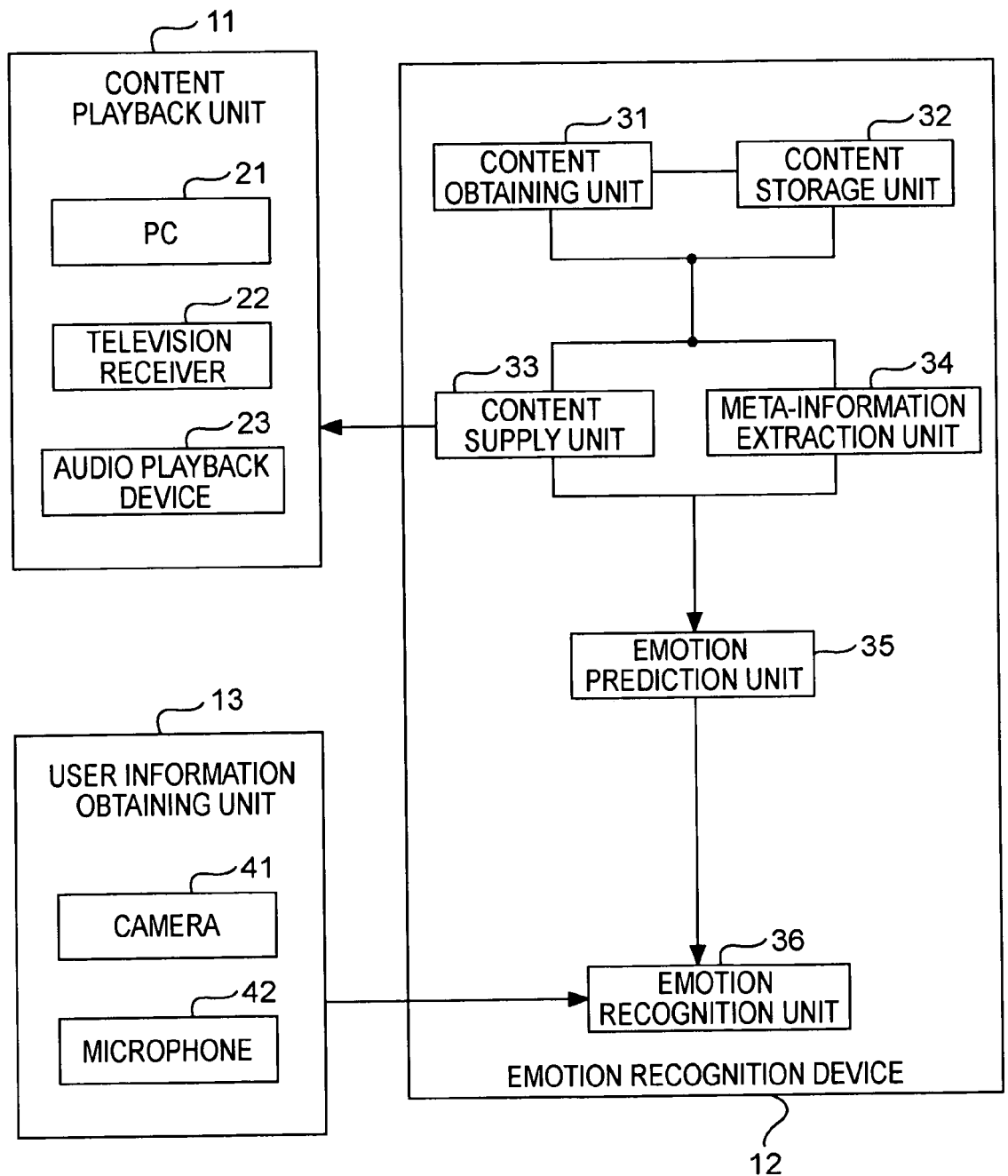
FIG. 1 is a diagram showing a structure of a system according to an embodiment of the present invention.

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

An information processing apparatus according to an embodiment of the present invention includes obtaining means (e.g., a meta-information extraction unit 34 shown in FIG. 1) for obtaining meta-information concerning content; predicting means (e.g., an emotion prediction unit 35 shown in FIG. 1) for predicting an emotion of a user who is viewing the content from the meta-information obtained by the obtaining means; and recognizing means (e.g., an emotion recognition unit 36 shown in FIG. 1) for recognizing an emotion of the user using the emotion predicted by the predicting means and information acquired from the user.

The information processing apparatus further includes sound-feature-value extracting means (e.g., an acoustic-feature extraction unit 69 shown in FIG. 2) for collecting sound emitted from the user and extracting a feature value from the collected sound.

The information processing apparatus further includes an image-feature-value extracting means (e.g., an image-feature extraction unit 67 shown in FIG. 2) for capturing an image of the user and extracting a feature value from the captured image.

An embodiment of the present invention will be described with reference to the drawings.

Example System Configuration

FIG. 1 shows a structure of a system according to an embodiment of the present invention. The system shown in FIG. 1 is operable to recognize (or estimate) a user's emotion. The system shown in FIG. 1 obtains information acquired from the user (such as tone of voice or facial expressions) (hereinafter referred to as "user information") and information concerning content being browsed (viewed and/or listened to) by the user, and recognizes the emotion of the user. The recognized emotion of the user can be used as, for example, information for selecting the information to be recommended to the user.

The system shown in FIG. 1 includes a content playback unit 11 that provides content to the user, an emotion recognition device 12 that recognizes the emotion of the user, and a user information obtaining unit 13 that obtains user information and that supplies the user information to the emotion recognition device 12.

The content playback unit 11 receives content (content data) from the emotion recognition device 12. The content playback unit 11 includes a personal computer (PC) 21, a television receiver 22, and an audio playback device 23. The content playback unit 11 will be described as including, but not limited to, the devices described above, and it may further include other devices.

In the following discussion, the PC 21 is a device for playing back content such as games; the television receiver 22 is a device for playing back content obtained by playing back a television broadcast program or a digital versatile disc (DVD); and the audio playback device 23 is a device for playing back content obtained by playing back a radio broadcast program or a compact disc (CD). The data of the content to be played back by these devices is supplied from the emotion recognition device 12.

The emotion recognition device 12 includes a content obtaining unit 31, a content storage unit 32, a content supply unit 33, a meta-information extraction unit 34, an emotion prediction unit 35, and an emotion recognition unit 36. The content obtaining unit 31 obtains content, such as video, music, or game, through television broadcasting, radio broadcasting, or a network. Once a device, such as a DVD player or a CD player, is connected to the network, the content to be played back by the device can be obtained.

The content obtaining unit 31 obtains the content, as well as attached information available regarding the content, such as electronic program guide (EPG) data, closed-caption information, or review text. The content storage unit 32 stores the content and the attached information obtained by the content obtaining unit 31.

The content supply unit 33 supplies the content obtained by the content obtaining unit 31 or the content stored in the content storage unit 32 to one of the PC 21, the television receiver 22, and the audio playback device 23 of the content playback unit 11, which is compatible with the content, so that the user can view the content.

The meta-information extraction unit 34 extracts meta-information concerning the content obtained by the content obtaining unit 31 or the content stored in the content storage unit 32. For example, if the content is a television broadcast program, the meta-information includes keywords obtained by analyzing text information attached to the program, such as the genre to which the program belongs, plot synopsis, and reviews. If the content is music, the meta-information includes keywords obtained by analyzing lyrics, reviews, and so forth, and information obtained by acoustically analyzing a song, such as a high-tempo or low-tempo song or a light-sounding or dark-sounding song.

The emotion prediction unit 35 predicts the emotion of the user using the meta-information extracted by the meta-information extraction unit 34 in association with the content supplied by the content supply unit 33 to the content playback unit 11. The emotion prediction unit 35 performs prediction processing according to information stored in the form of a table or a probability table, as discussed below with reference to FIGS. 3 and 4. The emotion recognition unit 36 recognizes the emotion of the user based on the user information obtained by the user information obtaining unit 13, such as expressions, gestures, and voice of the user.

The user information obtaining unit 13 includes a camera 41 and a microphone 42. The camera 41 takes a face or full-body shot of the user, and supplies the shot to the emotion recognition unit 36. The information supplied from the camera 41 to the emotion recognition unit 36 may be still-image data or moving-picture data. The microphone 42 collects sound emitted from the user (e.g., voice or hand-clapping sound), and supplies the data of the sound to the emotion recognition unit 36.

As shown in FIG. 1, the emotion recognition device 12 will be described as including, but not limited to, a device for supplying content data to the content playback unit 11. For example, the content obtaining unit 31, the content storage unit 32, the content supply unit 33, and the meta-information extraction unit 34 may not be included in the emotion recognition device 12, and may be provided as separate devices (independent devices).

When a device for supplying content data (hereinafter referred to as a "content processing unit") is provided separately from the emotion recognition device 12, content data and meta-information may be supplied from the content processing unit to the emotion recognition device 12. For example, the content processing unit may be incorporated in a DVD player or the like capable of processing content data.

Figure 2:
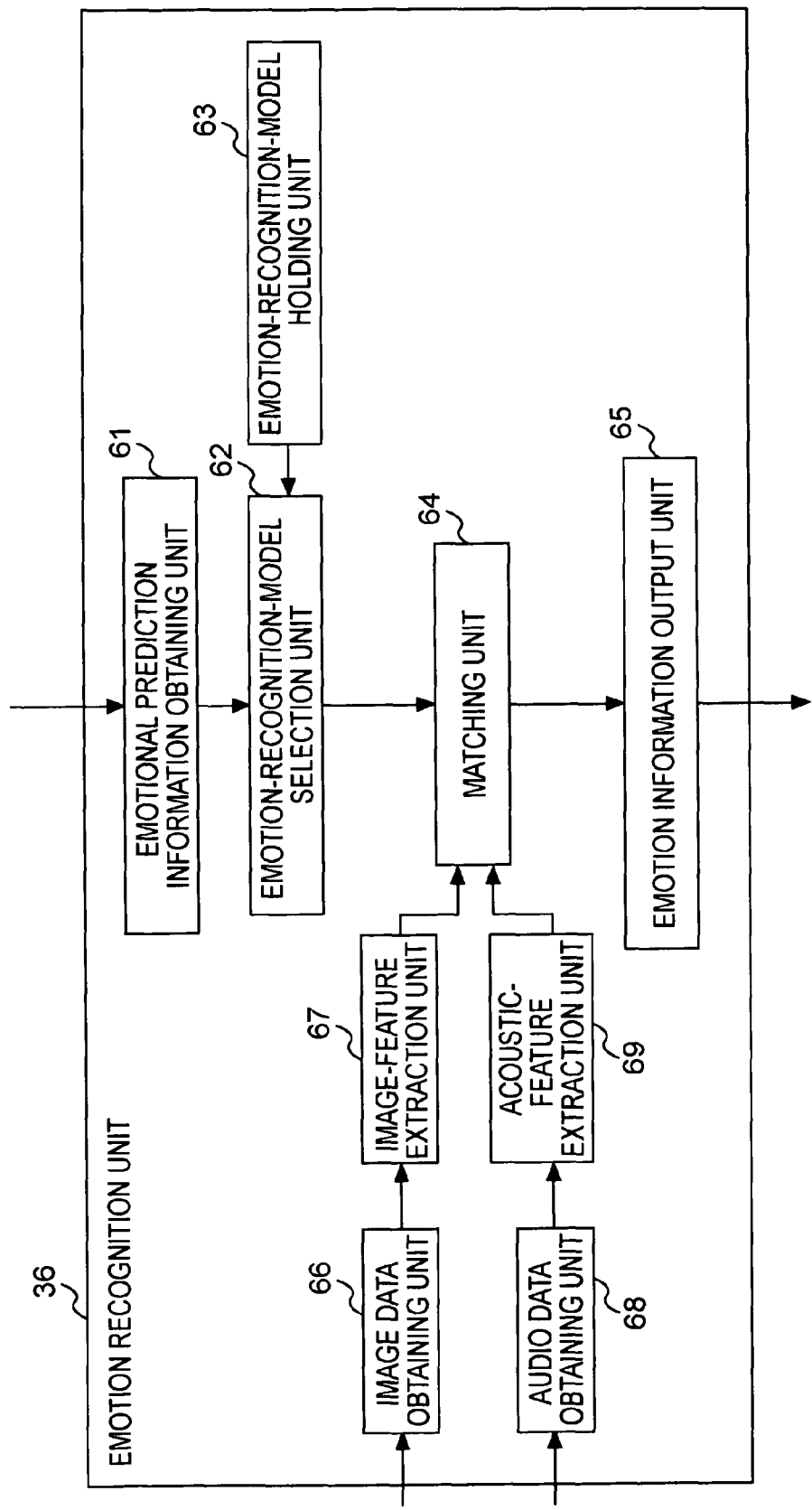
FIG. 2 is a diagram showing in detail an example structure of an emotion recognition unit.

FIG. 2 specifically shows an example structure of the emotion recognition unit 36. The emotion recognition unit 36 includes an emotional prediction information obtaining unit 61, an emotion-recognition-model selection unit 62, an emotion-recognition-model holding unit 63, a matching unit 64, an emotion information output unit 65, an image data obtaining unit 66, an image-feature extraction unit 67, an audio data obtaining unit 68, and an acoustic-feature extraction unit 69.

The emotional prediction information obtaining unit 61 obtains prediction information (prediction result) from the emotion prediction unit 35 (see FIG. 1). The prediction information obtained from the emotional prediction information obtaining unit 61 is supplied to the emotion-recognition-model selection unit 62. The emotion-recognition-model selection unit 62 selects appropriate emotion-recognition models from the emotion-recognition-model holding unit 63 based on the prediction information (that is, the predicted emotion of the user) from the emotion prediction unit 35, and supplies the selected emotion-recognition models to the matching unit 64.

The matching unit 64 performs matching between feature values individually supplied from the image-feature extraction unit 67 and the acoustic-feature extraction unit 69 and the emotion-recognition models supplied from the emotion-recognition-model selection unit 62, and calculates scores for the individual models. The feature values are supplied to the matching unit 64 from the image-feature extraction unit 67 and the acoustic-feature extraction unit 69 in accordance with data supplied to the image-feature extraction unit 67 and the acoustic-feature extraction unit 69 from the image data obtaining unit 66 and the audio data obtaining unit 68, respectively.

Specifically, the image data obtaining unit 66 obtains image data from the camera 41 (see FIG. 1), and supplies the obtained image data to the image-feature extraction unit 67. The image-feature extraction unit 67 extracts feature values necessary for recognizing the emotion of the user from the supplied image data, and supplies the feature values to the matching unit 64.

The audio data obtaining unit 68 obtains audio data from the microphone 42 (see FIG. 1), and supplies the obtained audio data to the acoustic-feature extraction unit 69. The acoustic-feature extraction unit 69 extracts feature values necessary for recognizing the emotion of the user from the supplied audio data, and supplies the feature values to the matching unit 64.

The matching unit 64 performs matching between the feature values supplied from the image-feature extraction unit 67 and the acoustic-feature extraction unit 69 and the emotion-recognition models supplied from the emotion-recognition-model selection unit 62, and calculates scores for the individual models, as previously described.

Accordingly, the matching unit 64 performs matching processing (to recognize the emotion of the user) using (or based on) the user's emotion determined from the data obtained from the camera 41 and the microphone 42 and the meta-information obtained from the content being viewed by the user. Thus, a more detailed matching can be achieved.

The scores calculated by the matching unit 64 are supplied to the emotion information output unit 65. The emotion output unit 65 corrects the scores calculated by the matching unit 64 according to the emotion predicted by the emotion prediction unit 35 (see FIG. 1), and outputs a final emotion recognition result (emotion information).

The emotion information output from the emotion information output unit 65 is used as a piece of user's preference information for, for example, recommending a program to the user. The emotion information can also be used as information that helps provide the user with more accurate information when searching for information via a network or the like.

The emotion information output from the emotion information output unit 65 may be fed back to the emotion prediction unit 35. The feedback mechanism allows the emotion prediction unit 35 to be adapted to the user of the emotion recognition device 12, and the accuracy of emotion recognition can be increased. Specifically, a probability table may be updated based on the current status of the meta-information and the actually recognized emotion.

The selection of emotion-recognition models by the emotion-recognition-model selection unit 62 and the correction of matching scores by the emotion information output unit 65 may be independently performed, and either one or both of them may be performed.

Data on emotions stored in the emotion prediction unit 35 will be described with reference to FIGS. 3 and 4. FIGS. 3 and 4 illustrate data on emotions in the context of a case where the content is a television broadcast program. The data on the emotions is stored in the emotion prediction unit 35 in the form of a table 81 shown in FIG. 3 or a table 82 shown in FIG. 4. The table 81 is a table including genre information and predictable emotions. The table 82 is a probability table including the genre information and the individual emotions in association with probabilities.

The table 81 shown in FIG. 3 includes genre information of programs, and lists of predictable emotions, which are user emotions to be predicted from the information on the genres of the programs, in association with each other. The table 81 shown in FIG. 3 includes genres including "variety shows", "sports", "romantic dramas", and "horror films" as the genre information. A list of user emotions to be predicted (i.e., predictable emotions) is associated with each of the genres.

For example, the genre information "variety shows" is associated with a list of emotions "happiness", "laughter", "applause", "surprise", "anger", and "disgust" as the predictable emotions. Likewise, the remaining genre information is associated with predictable emotions in the manner shown in FIG. 3.

When the table 81 is stored in the emotion prediction unit 35, the information on the predictable emotions corresponding to the content being viewed by the user (which is a part of the information of the table 81) is output from the emotion prediction unit 35 (and is supplied to the emotion recognition unit 36).

The table 82 shown in FIG. 4 includes genre information of programs, and lists of predictable emotions, which are user emotions to be predicted from the information on the genres of the programs. In the table 82, the possibility (probability value) of an occurrence of each of the predictable emotions is further given. As in the table 81 shown in FIG. 3, the table 82 shown in FIG. 4 includes genres including "variety shows", "sports", "romantic dramas", and "horror films" as the genre information.

Each of the genres is associated with user emotions to be predicted (i.e., predictable emotions). For example, the genre information "variety shows" is associated with emotions "surprise", "fear", "disgust", "anger", "happiness", "sadness", "laughter", "applause", "cry", and "yell" as the predictable emotions. Each of the associated predictable emotions is further associated with a probability value. The probability value is a value indicating the probability of occurrence of a predetermined predictable emotion with respect to a predetermined genre.

For example, the predictable emotion "surprise" has a probability value of 0.1 with respect to the genre information "variety shows". Likewise, the remaining predictable emotions and the predictable emotions with respect to the remaining genre information are associated with probability values, as shown in FIG. 4.

In the probability table 82 shown in FIG. 4, if genre information of a program is represented by J, the probability at which a user emotion (E) occurs, given by P(E|J), is stored in the form of a table.

When the table 82 is stored in the emotion prediction unit 35, the information on the predictable emotions and probability values corresponding to the content being viewed by the user (which is a part of the information of the table 82) is output from the emotion prediction unit 35 (and is supplied to the emotion recognition unit 36).

Operation of Emotion Recognition Device

Figure 5:
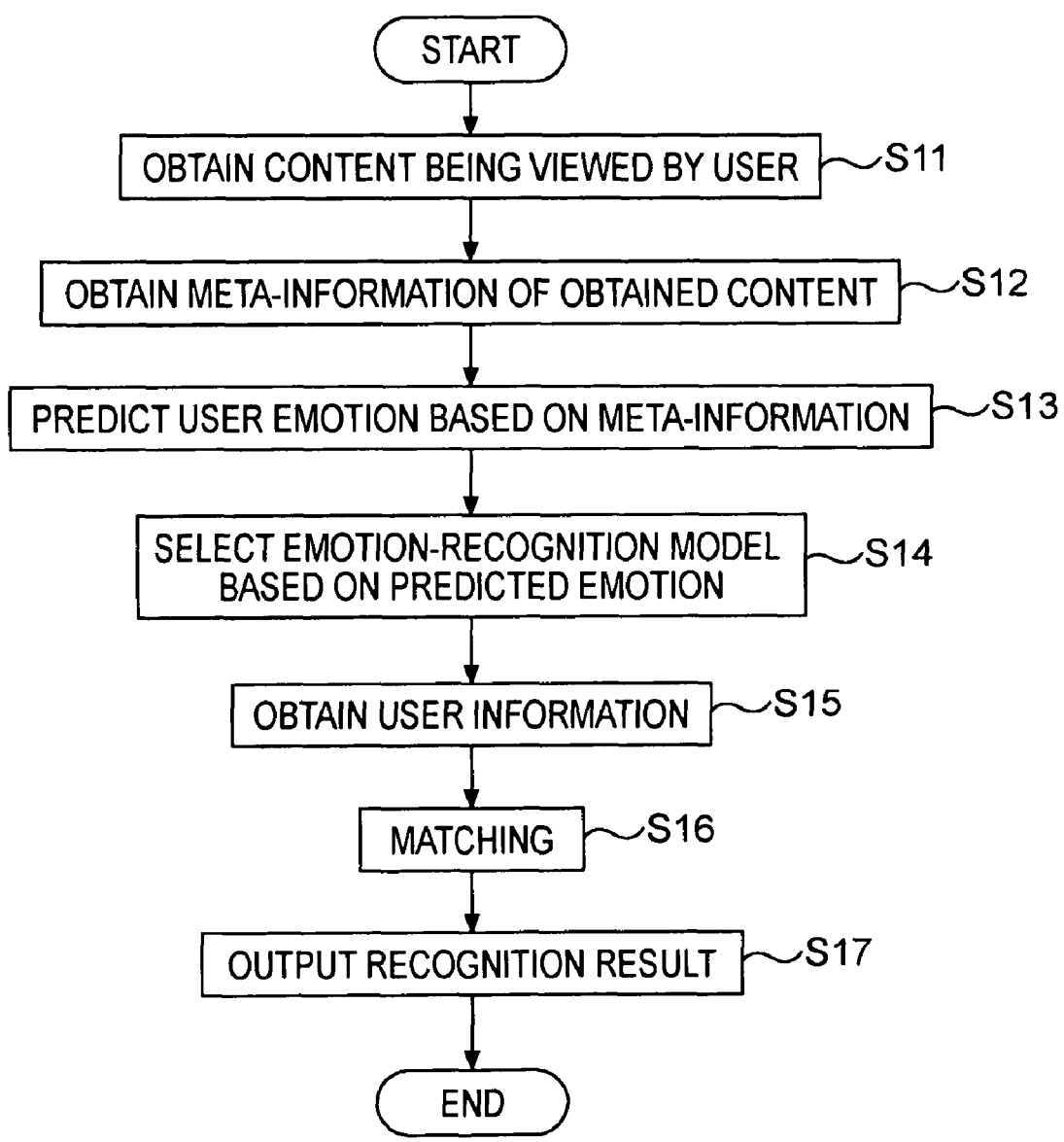
FIG. 5 is a flowchart showing the operation of an emotion recognition device.

The operation of the emotion recognition device 12 will be described with reference to the flowchart of FIG. 5. In step S11, the content being viewed by the user is obtained. The content to be obtained is content that is supplied by the content supply unit 33 (see FIG. 1) to the content playback unit 11 and that is obtained by the content obtaining unit 31 or stored in the content storage unit 32.

In step S12, meta-information concerning the obtained content is obtained. The meta-information extraction unit 34 extracts meta-information concerning the content supplied by the content supply unit 33, and supplies the meta-information to the emotion prediction unit 35. As discussed above, if the content is a television broadcast program, the meta-information includes text information attached to the program, such as the genre to which the program belongs, plot synopsis, and reviews, and keywords obtained by analyzing the text information.

If the content being viewed by the user includes speech, a speech recognition device (not shown) may extract keywords from utterances contained in the content as meta-information (that is, the speech recognition device may be configured to perform speech recognition on utterances, to convert the recognized utterances into text, and to extract meta-information from the text). In this case, the emotion prediction unit 35 is provided with a device for recognizing (or analyzing) speech. In this structure, the emotion prediction unit 35 stores a table (e.g., the table 81 shown in FIG. 3) or a probability table (e.g., the table 82 shown in FIG. 4) in which keywords extracted from speech and emotions corresponding to the keywords are associated with each other.

If the content being viewed (i.e., listened to) by the user is music, acoustic feature values of a song may be extracted as meta-information. In this case, the emotion prediction unit 35 is provided with a device capable of extracting feature values from a song. In this structure, the emotion prediction unit 35 stores a table or a probability table in which the overall impression (category) of the song determined from the feature values extracted from the song, such as a light-sounding or dark-sounding song, and predictable user emotions are associated with each other.

If the content being viewed by the user includes video information, information on the performers appearing in the content may be used as meta-information. When the information on the performers is used as meta-information, for example, a technique for recognizing a face of a performer from the video information concerning the content is used to specify the performer, and thus the information on the performers is extracted as meta-information. In the processing for specifying a performer, for example, a facial image is extracted from the video information concerning the content, and matching is performed between the extracted image and an image for specifying the performer (for example, an image based on image data of the performer, the image data being stored in the content storage unit 32), thereby specifying the performer.

Information indicating which performer appears and in which time zone the performer appears may be obtained from EPG data or the like for the program. In order to specify a performer, performers who appear in a given time zone are selected according to the information obtained from the EPG data, and matching is performed between the images of the selected performers and the facial image obtained from video information concerning the content. Thus, the time for performing the matching (i.e., the time for specifying the performer) can be reduced, and the matching accuracy can be increased.

The use of information, such as EPG data, allows a dynamic prediction of the emotion prediction unit 35 over time. EPG data is auxiliary information attached to content, and is associated with the broadcast time, a program, performers appearing in the program, and so forth.

As described above, the use of EPG data for a program facilitates to specify a performer, or allows a dynamic prediction of the emotion prediction unit 35 over time. The dynamic prediction of the emotion prediction unit 35 can be achieved by dynamically changing the meta-information extracted by the meta-information extraction unit 34.

Therefore, the emotion can be more precisely predicted. For example, in a scene where comedians appear in a television broadcast program, the prediction values of laugh and happiness can be increased.

The prediction may be performed using only one piece of meta-information or a combination of pieces of meta-information. A user's emotion can be more precisely predicted using various types of information as meta-information, and the prediction accuracy can therefore be improved.

As described above, the table 81 or the probability table 82 may be dynamically updated in accordance with the progress of content to improve the prediction accuracy.

The following description will be given assuming that the content is a television broadcast program and genre information is extracted as meta-information.

In step S12, the meta-information is extracted (or obtained). In step S13, the emotion prediction unit 35 predicts the emotion of the user. The emotion prediction unit 35 stores the table 81 shown in FIG. 3 or the table 82 shown in FIG. 4. The emotion prediction unit 35 refers to the table 81 or 82, and extracts information corresponding to the supplied meta-information (in this case, the genre information) from the table 81 or 82. The extracted information is supplied to the emotion recognition unit 36 (see FIG. 1) as the predicted emotion.

In step S14, emotion-recognition models are selected based on the predicted emotion. The emotion-recognition models may be models directly representing user emotions, such as "anger", "happiness", and "sadness", or may be models indirectly representing user emotions, such as "laughter" and "applause" (that is, models representing behaviors and actions of the user when the user feels a predetermined emotion). The emotion-recognition models can be implemented using existing machine-learning-based models, such as hidden Markov models (HMMs) or support vector machine (SVM) models.

The HMM technique can also be used to recognize facial expressions representing emotions, such as "anger", "disgust", "fear", "sadness", "happiness", and "surprise". In this embodiment, not only the HMM technique is used to recognize the emotion of the user, but also information (meta-information) concerning the content being viewed by the user is used in order to more accurately recognize the emotion of the user.

The emotion-recognition models selected by the emotion-recognition-model selection unit 62 in step S14 are supplied to the matching unit 64. In step S15, the matching unit 64 obtains user information. The user information is information acquired from the user, and includes the information (feature values) supplied from the image-feature extraction unit 67, such as facial expressions and gestures of the user, and the information (feature values) supplied from the acoustic-feature extraction unit 69, such as voice of the user and handclapping sound. The user information is therefore information for recognizing the emotion of the user from user's expressions or behaviors.

In step S16, the matching unit 64 performs matching between the feature values supplied from the image-feature extraction unit 67 and the acoustic-feature extraction unit 69 and the emotion-recognition models supplied from the emotion-recognition-model selection unit 62. As a result of the matching, scores for the individual emotion-recognition models are calculated. That is, matching (score calculation) is carried out between the emotion-recognition models recognized from the content being viewed by the user and the user's emotion determined (or recognized) from the actual verbal and non-verbal behaviors of the user when the user is viewing the content.

The matching processing may be performed by weighting the matching scores according to the information predicted by the emotion prediction unit 35. The weighting allows more accurate matching (that is, more accurate recognition of the user's emotion).

The matching method (i.e., the method for recognizing a user's emotion) may be implemented using, for example, a recognition method based on the Bayes decision rule. In the recognition method based on the Bayes decision rule, if an observation signal input from a sensor (e.g., the feature values from the image-feature extraction unit 67 and the acoustic-feature extraction unit 69) is represented by x and the emotion at that time is represented by e, the emotion e that maximizes the posterior probability, p(e|x), is used as a recognition result.

The posterior probability can be given using Bayes' theorem as follows:

$$p(e|x)=p(x|e) \cdot p(e)/p(x)$$

where p(e) denotes the prior probability of the emotion e. By using the probability determined by the emotion prediction unit 35 (that is, the user's emotion determined from the meta-information on the content) as the prior probability, the recognition accuracy can be increased.

In step S17, the emotion output unit 65 corrects the scores calculated by the matching unit 64 according to the emotion predicted by the emotion prediction unit 35, and outputs a final emotion recognition result.

The emotion recognition result output from the emotion output unit 65 is fed back to the emotion prediction unit 35 so that the emotion prediction unit 35 can be adapted to the user to increase the accuracy. That is, the table (the table 81 or 82) may be updated based on the current status of the meta-information and the actually recognized emotion. The emotion recognition result may also be used as a piece of information indicating the user's preference to obtain information suited to the preference of the user when obtaining (or searching for) some information via a network.

The selection of emotion-recognition models by the emotion-recognition-model selection unit 62 and the correction of scores for the matching performed by the matching unit 64, which is performed by the emotion output unit 65, may be independently performed, and either one or both of them may be performed.

In this embodiment, as discussed above, the extraction of meta-information and the playback of content are performed in parallel. However, meta-information for the content stored in the content storage unit 32 may be extracted in advance, and the extracted meta-information may also be stored. In this case, the processing load during playback of the content can be reduced.

Therefore, meta-information concerning content being viewed by the user is used to recognize the emotion of the user, thus achieving more accurate recognition of the user's emotion. Since personal preference information with respect to the content being viewed is extracted, an emotion associated with the information defined in the meta-information can be accurately extracted.

The system according to the embodiment of the present invention allows more accurate feedback of evaluation of the user with respect to content being viewed by the user, and user's preference information with respect to the content can therefore be elaborated.

Recording Medium

Figure 6:
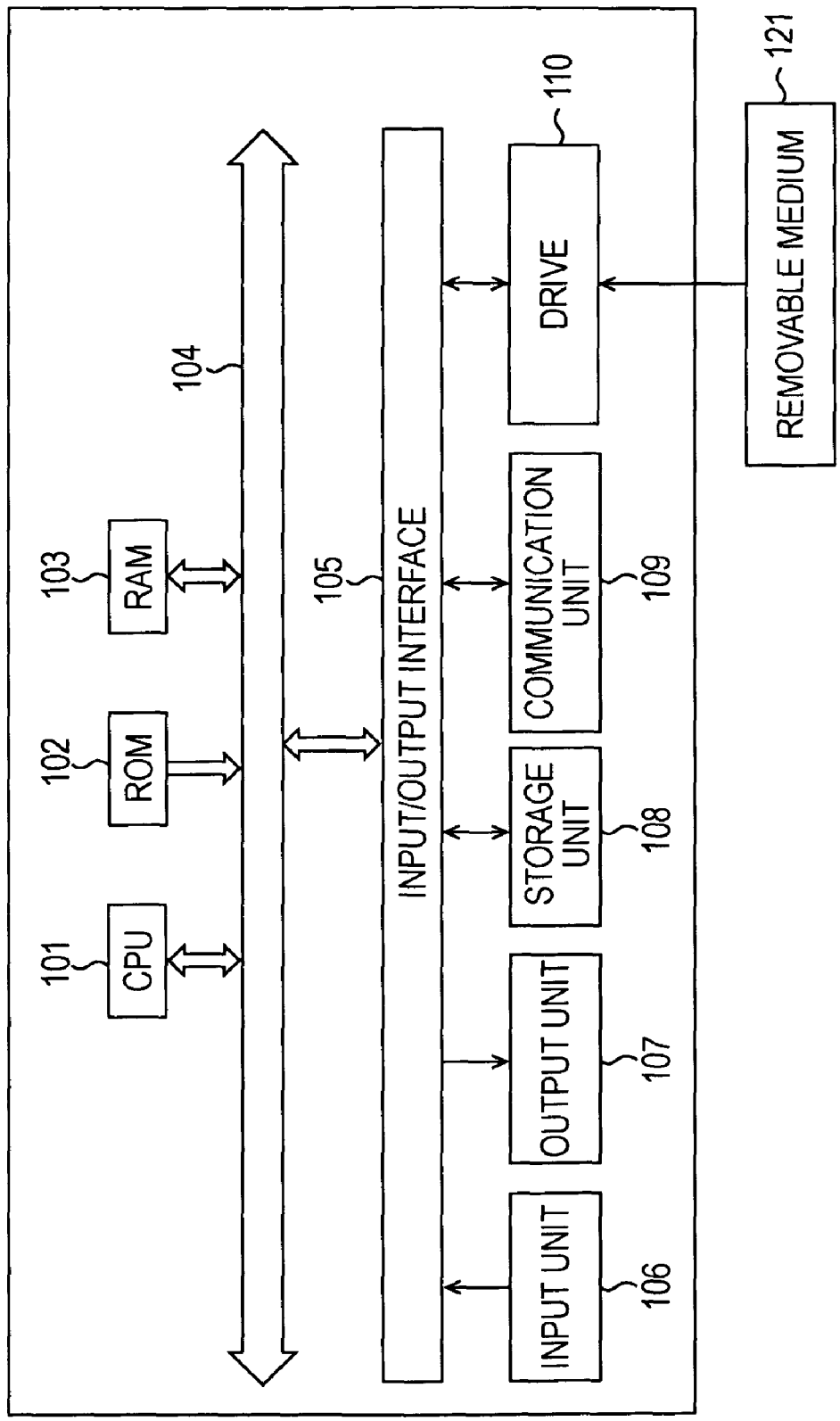
FIG. 6 is a diagram showing a recording medium.

FIG. 6 is a block diagram showing an example structure of a personal computer that executes the above-described series of processes according to a program. A central processing unit (CPU) 101 executes various types of processing according to a program stored in a read-only memory (ROM) 102 or a storage unit 108. A random access memory (RAM) 103 stores the program executed by the CPU 101 and data, as appropriate. The CPU 101, the ROM 102, and the RAM 103 are connected to one another via a bus 104.

The CPU 101 is also connected to an input/output interface 105 via the bus 104. The input/output interface 105 is connected to an input unit 106 including a keyboard, a mouse, and a microphone, and an output unit 107 including a display and a speaker. The CPU 101 executes various types of processing in response to an instruction input from the input unit 106. Then, the CPU 101 outputs a result of the processing to the output unit 107.

The storage unit 108 connected to the input/output interface 105 is composed of, for example, a hard disk, and is operable to store the program executed by the CPU 101 and various data. A communication unit 109 communicates with an external device via a network, such as the Internet or a local area network.

The program may be obtained via the communication unit 109, and may be stored in the storage unit 108.

A drive 110 is connected to the input/output interface 105. When a removable medium 121, such as a magnetic disk, an optical disk, a magneto-optical disk, or a semiconductor memory, is attached, the drive 110 drives the attached medium 121, and obtains the program and data stored therein. The obtained program and data are transferred to and stored in the storage unit 108, as necessary.

A program storage medium for storing a program that is installed in a computer and executable by the computer is formed of, as shown in FIG. 6, the removable medium 121, which is a packaged medium, such as a magnetic disk (including a flexible disk), an optical disk (including a compact disc-read only memory (CD-ROM) and a digital versatile disc (DVD)), a magneto-optical disk (including a Mini-Disc (MD)), or a semiconductor memory, the ROM 102 in which the program is temporarily or persistently stored, a hard disk constituting the storage unit 108, or the like. The program is stored in the program storage medium, if necessary, via the communication unit 109, which is an interface such as a router or a modem, using a wired or wireless communication medium such as a local area network, the Internet, or digital satellite broadcasting.

In this specification, steps defining a program stored in a program storage medium may include processes that are executed sequentially in the orders described, and also include processes that are executed in parallel or individually, not necessarily sequentially.

In this document, the term "system" implies the entire apparatus including a plurality of devices.

The embodiment described above is a mere example of embodiments of the present invention, and a variety of modifications may be made without departing from the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for recognizing a user's emotion, said apparatus comprising:
    obtaining means for obtaining meta-information concerning content;
    predicting means for predicting an emotion of a user who is viewing the content from the meta-information obtained by the obtaining means; and
    recognizing means for recognizing an emotion of the user using the emotion predicted by the predicting means and user information acquired from the user, wherein said recognizing means comprises a prediction information obtaining means, a recognition-model selection means, a recognition-model holding means, and a matching means, wherein a method for recognizing a user's emotion is based on the Bayes decision rule,
    wherein said prediction information obtaining means obtains prediction information from said predicting means and supplies said prediction information to said recognition-model selection means to select appropriate recognition model(s) from said recognition-model holding means based on said prediction information, and supplies the selected recognition model(s) to said matching means,
    wherein an emotion recognition result output from said emotion recognizing means is fed back to said emotion predicting means so that said emotion predicting means can be adapted to said user, and wherein the emotion recognition result is used as information indicating the user's preference to obtain information suited to the preference of the user when obtaining information via a network, wherein the emotion is an emotion of a user who is viewing the content.

2. The information processing apparatus according to claim 1, wherein the recognizing means performs weighting for the emotion of the user according to the emotion predicted by the predicting means.

3. The information processing apparatus according to claim 1, further comprising
    sound-feature-value extracting means for collecting sound emitted from the user and extracting a feature value from the collected sound, wherein the recognizing means uses the feature value extracted by the sound-feature-value extracting means as the user information.

4. The information processing apparatus according to claim 1, further comprising
    image-feature-value extracting means for capturing an image of the user and extracting a feature value from the captured image, wherein the recognizing means uses the feature value extracted by the image-feature-value extracting means as the user information.

5. The information processing apparatus according to claim 1, wherein the meta-information obtained by the obtaining means comprises text information concerning the content.

6. The information processing apparatus according to claim 1, wherein when the content includes audio information, the obtaining means extracts a feature value from the audio information, and obtains the extracted feature value as the meta-information.

7. The information processing apparatus according to claim 1, wherein when the content includes speech information, the obtaining means recognizes speech based on the speech information, and obtains text extracted from the recognized speech as the meta-information.

8. The information processing apparatus according to claim 1, wherein when the content includes video information, the obtaining means obtains information concerning performers appearing in video based on the video information as the meta-information.

9. The information processing apparatus according to claim 1, wherein when the content has time information attached thereto, the obtaining means extracts the meta-information in accordance with the progress of the content according to the time information.

10. The information processing apparatus according to claim 1, wherein:
    the predicting means includes a table used to predict the emotion of the user;
    the emotion of the user recognized by the recognizing means is supplied to the predicting means; and
    the predicting means updates the table in response to the supplied recognized emotion of the user.

11. An information processing method carried out on an information processing apparatus for recognizing a user's emotion, the method comprising the steps of:
    obtaining, via a processor, meta-information concerning content from an obtaining unit; predicting an emotion of a user who is viewing the content from the obtained meta-information using a predicting unit; and
    recognizing using the processor, an emotion of the user using the predicted emotion and information acquired from the user by a recognizing unit, wherein said recognizing step further comprises the steps of:
    obtaining prediction information from said predicting step;
    supplying said prediction information to a recognition-model selection step to select appropriate recognition model(s) from a recognition-model holding means based on said prediction information, and supplying the selected recognition model(s) to a matching step, wherein a method for recognizing a user's emotion is based on the Bayes decision rule, wherein an emotion recognition result output from said emotion recognizing unit is fed back to said emotion predicting unit so that said emotion predicting means can be adapted to said user, and wherein the emotion recognition result is used as information indicating the user's preference to obtain information suited to the preference of the user when obtaining information via a network, wherein the emotion is an emotion of a user who is viewing the content.

12. A computer-readable program recorded on a non-transitory computer-readable medium for causing a computer to carry out an information processing method for recognizing a user's emotion, the method comprising the steps of:
- obtaining meta-information concerning content from an obtaining unit;
- predicting an emotion of a user who is viewing the content from the obtained meta-information using a predicting unit; and
- recognizing an emotion of the user using the predicted emotion and information acquired from the user by a recognizing unit, wherein said recognizing step further comprises the steps of:
- obtaining prediction information from said predicting step,
- supplying said prediction information to a recognition-model selection step to select appropriate recognition model(s) from a recognition-model holding means based on said prediction information, and
- supplying the selected recognition model(s) to a matching step,
- wherein a method for recognizing a user's emotion is based on the Bayes decision rule,
- wherein an emotion recognition result output from said emotion recognizing unit is fed back to said emotion predicting unit so that said emotion predicting unit can be adapted to said user, and wherein the emotion recognition result is used as information indicating the user's preference to obtain information suited to the preference of the user when obtaining information via a network, wherein the emotion is an emotion of a user who is viewing the content.

13. An information processing apparatus comprising:
- an obtaining unit that obtains meta-information concerning content;
- a predicting unit that predicts an emotion of a user who is viewing the content from the meta-information obtained by the obtaining unit; and
- a recognizing unit that recognizes an emotion of the user using the emotion predicted by the predicting unit and user information acquired from the user, wherein said recognizing unit comprises a prediction information obtaining unit, a recognition-model selection unit, a recognition-model holding unit, and a matching unit, wherein a method for recognizing a user's emotion is based on the Bayes decision rule,
- wherein said prediction information obtaining unit obtains prediction information from said predicting unit and supplies said prediction information to said recognition-model selection unit to select appropriate recognition model(s) from said recognition-model holding unit based on said prediction information, and supplies the selected recognition model(s) to said matching unit, wherein an emotion recognition result output from said emotion recognizing unit is fed back to said emotion predicting unit so that said emotion predicting unit can be adapted to said user, and wherein the emotion recognition result is used as information indicating the user's preference to obtain information suited to the preference of the user when obtaining information via a network, wherein the emotion is an emotion of a user who is viewing the content, wherein the obtaining, predicting, and recognizing units comprise hardware implementation.

* * * * *